Dec. 30, 1924.  
E. BURHORN  
WATER COOLING SPRAY NOZZLE  
Filed Nov. 4, 1919
1,520,929
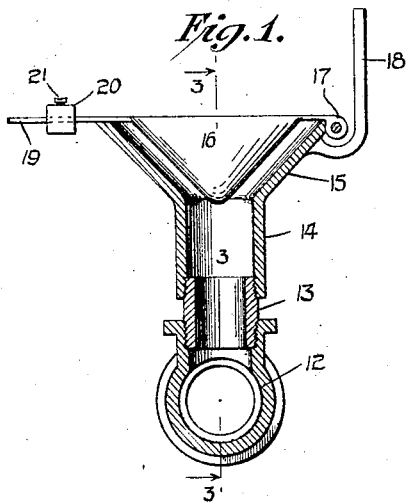
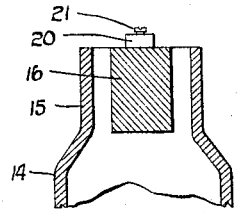
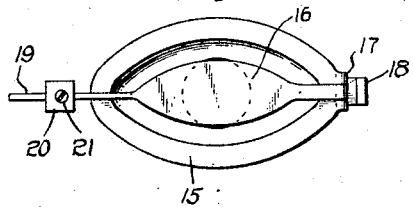
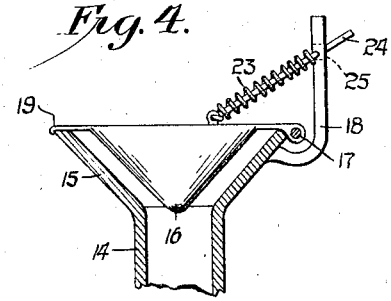
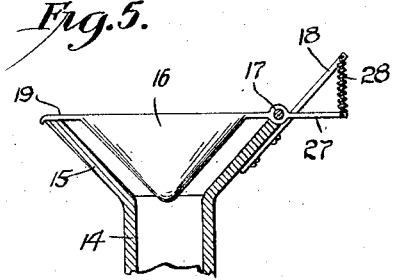
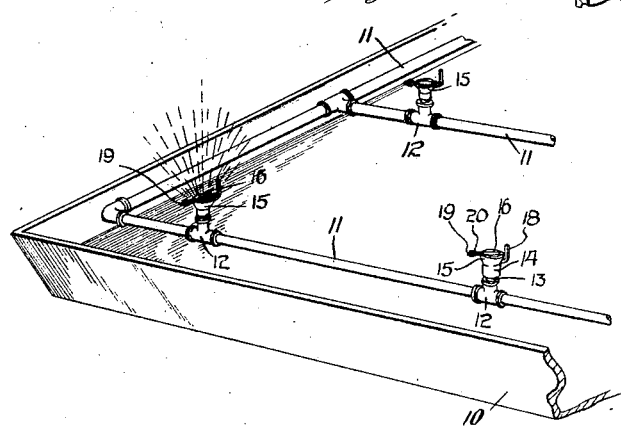
INVENTOR  
Edwin Burhorn,  
BY  
Rogers, Kennedy & Campbell  
ATTORNEYS.

Patented Dec. 30, 1924.

1,520,929

UNITED STATES PATENT OFFICE.

EDWIN BURHORN, OF HOBOKEN, NEW JERSEY.

WATER-COOLING SPRAY NOZZLE.

Application filed November 4, 1919. Serial No. 335,584.

*To all whom it may concern:*

Be it known that I, EDWIN BURHORN, a citizen of the United States, residing at Hoboken, in the county of Hudson and State of New Jersey, have invented certain new and useful Improvements in Water-Cooling Spray Nozzles, of which the following is a specification, reference being had therein to the accompanying drawing.

This invention is a novel water-cooling spray-nozzle, this having reference to an upwardly directed nozzle arranged above a pond, pool or other receptacle, for spraying into the atmosphere the water to be cooled, circulated, for example, from the condenser of a power plant or factory, the evaporation of a part of the sprayed hot water and contact with natural currents of air serving to reduce the temperature of the water which descends and is collected for re-circulation.

The main object of the present invention is to afford a spray nozzle of the kind referred to which will effectively spread or spray the heated water, and which nevertheless will be free from the necessity of constant manual cleaning due to clogging of the restricted spraying passages of the nozzle by accumulation of solid matter frequently occuring in the water. Other objects and advantages of the present invention will be elucidated in the hereinafter following description of one form or embodiment thereof, or will be apparent to those skilled in the art.

To the accomplishment of such objects and advantages the present invention consists in the novel water cooling spray nozzle shown and described herein, and the novel features of construction, arrangement, combination and detail thereof.

In the accompanying drawings forming a part hereof, Fig. 1 is a vertical cross-section of a spray nozzle embodying the features of the present invention.

Fig. 2 is a top plan view thereof.

Fig. 3 is a vertical section taken on the line 3—3 of Fig. 1, with modifications introduced.

Figs. 4 and 5 are views similar to Fig. 1 of further modifications.

Fig. 6 is a perspective view of a water pond, pool or vessel over which are arranged a plurality of the spray nozzles hereof.

The water-cooling spray-nozzle of the present invention is characterized as having a flaring exit, together with a spreader or tapered body movably fitted within the nozzle so as to normally occupy the flared exit, thus affording narrow spray passages within the nozzle walls for spreading the water, but fitted by a hinge or otherwise so as to yield temporarily or swing outwardly for the purpose of discharge of any accumulation of solid matter within the nozzle. The interior of the spray nozzle hereof is wholly free from any obstruction or anything tending to catch and accumulate solid matter with the exception of the yielding spreader itself. In operation solid matter such as sticks, straws, strings, may be safely allowed to accumulate behind or beneath the spreader, rather than attempting to strain them out at an earlier point in the circuit. As the solid matters increase, this causes an increase of resistance, and therefore, pressure in the outflowing water. The yielding spreader is set with a light pressure holding it in place, such that after a substantial degree of clogging the pressure exceeds the force holding the spreader in position, so that the latter yields, swinging up and out of the tapered exit of the nozzle. Thereupon the force of the water carries out all of the solid matter, and the spreader returns to normal position. The action is, therefore, automatic, the nozzle is self cleaning, and manual attention is dispensed with.

To describe the specific embodiment shown in Figs. 1, 2 and 6, the pool or water pan 10 is shown as having arranged above it a series of pipes or passages 11 for conveying the heated water to the nozzles. At suitably spaced points are T-pieces 12, above each of which is a coupling 13, to which is connected the lower part 14 of the nozzle. The upper or main part 15 of the nozzle is flared in one manner or another, and is occupied by the tapered spreader 16, the two thus affording narrow spray passages by which the water will be thrown in a cone-like or fan-like manner into the atmosphere.

The spreader 16 is shown as a tapered piece of solid metal, such that its own weight tends to hold it down to its seat. It is fitted to yield outwardly for the purposes described, for example, by being hinged at 17. This permits it to swing upwardly at the time of discharge, but to prevent its swinging so far as not to turn, a stop or post 18 is provided, which will limit the upward swing, so that, after the discharge of accumulated matter, the spreader will naturally return to its seat as shown.

To position the spreader in its proper place, it is shown as having an extension or finger 19 resting on the edge of the nozzle opposite the hinge. When it is desired to offer a greater resistance to discharge than the weight of the spreader, this may be supplemented in various ways, for example, a weight 20 may be mounted on the extension 19, and this may be set to different positions by the adjusting screw 21 in case it is desired to regulate the pressure, so as to prevent the discharging operations taking place too frequently or too infrequently.

Instead of having the nozzle exit flared in all directions, as shown in Fig. 2, it may be narrowed, with vertical walls in a longitudinal direction, as indicated in the cross-section Fig. 3. In this case a purely fan-like spray will be produced.

Instead of relying on gravity, a spring 23 may be used, tending to hold the spreader in normal position, as shown in Fig. 4. The spring may be arranged surrounding a rod 24 hinged to the spreader and passing through a hole 25 in the stop or post 18. A different spring arrangement may be used, as indicated in Fig. 5, in which an extension 27 is produced on the spreader with a tension spring between this and the overhanging post or stop 18.

It will thus be seen that I have thus described several embodiments attaining the advantages of the present invention. Since many matters of design, arrangement and detail may be modified without departing from the underlying principles, it is not intended to limit the invention to such matters except as set fort in the appended claims.

What is claimed is:

1. A water cooling apparatus having, above an open receiving pond, a spray-nozzle arranged to throw an upward spray of water into the natural air currents passing over such pond, and said spray-nozzle consisting of an upwardly directed funnel shaped nozzle exit with flaring walls forming a spreader chamber, and a tapered spreader member normally held in a position occupying such chamber but hinged at one side to yield automatically upwardly and outwardly at the free side due to increased pressure from accumulated solid matter within the nozzle, so that it will swing clear of the exit and permit the discharge of such matter, and to descend automatically after such discharge.

2. A water cooling apparatus as in claim 1 and wherein is a stop means combined with said swinging spreader member to limit the outward swinging thereof.

3. A water cooling apparatus, having, above an open receiving pond, a spray-nozzle arranged to throw an upward spray of water into the natural air currents passing over such pond, and said spray-nozzle consisting of an upwardly directed funnel shaped nozzle exit with flaring walls forming a spreader chamber, a tapered spreader member normally held in a position occupying such chamber but swingingly mounted to yield automatically upwardly and outwardly at one side due to increased pressure from accumulated solid matter within the nozzle, so that it will swing clear of the exit and permit the discharge of such matter, and a stop means arranged to so limit the outward swinging of the spreader member that it will descend automatically after such discharge action.

In testimony whereof, I have affixed my signature hereto.

EDWIN BURHORN.